(12) United States Patent
Nonaka et al.

(10) Patent No.: US 12,108,186 B2
(45) Date of Patent: Oct. 1, 2024

(54) COMPOSITE DISPLAY APPARATUS AND CONTROLLING METHOD THEREFOR

(71) Applicant: Sony Group Corporation, Tokyo (JP)

(72) Inventors: Hirotaka Nonaka, Kanagawa (JP); Osamu Kobayashi, Tokyo (JP); Hideki Akiyama, Tokyo (JP); Osamu Kihara, Saitama (JP); Toshiaki Idei, Kanagawa (JP)

(73) Assignee: Sony Group Corporation (JP)

( * ) Notice: Subject to any disclaimer, the term of this patent is extended or adjusted under 35 U.S.C. 154(b) by 106 days.

(21) Appl. No.: 17/923,062

(22) PCT Filed: May 14, 2021

(86) PCT No.: PCT/JP2021/018333
§ 371 (c)(1),
(2) Date: Nov. 3, 2022

(87) PCT Pub. No.: WO2021/241262
PCT Pub. Date: Dec. 2, 2021

(65) Prior Publication Data
US 2023/0156142 A1    May 18, 2023

(30) Foreign Application Priority Data
May 27, 2020    (JP) .................................. 2020-091971

(51) Int. Cl.
*H04N 5/63*      (2006.01)
*G09G 5/14*      (2006.01)

(52) U.S. Cl.
CPC .................. *H04N 5/63* (2013.01); *G09G 5/14* (2013.01); *G09G 2330/028* (2013.01)

(58) Field of Classification Search
CPC ....... H04N 5/63; G09G 5/14; G09G 2330/028
See application file for complete search history.

(56) References Cited

U.S. PATENT DOCUMENTS

2009/0312884 A1* 12/2009 Li .............................. G09F 9/33
                                                                   700/295
2021/0295760 A1*  9/2021 Lee ........................ G06F 3/1446

FOREIGN PATENT DOCUMENTS

| JP | 2001188524 A | 7/2001 |
| JP | 2015161728 A | 9/2015 |
| JP | 2019523452 A | 8/2019 |

OTHER PUBLICATIONS

International Search Report for PCT/JP2021/018333 mailed Aug. 10, 2021. 3 pgs.

* cited by examiner

*Primary Examiner* — Michael B. Pierorazio
(74) *Attorney, Agent, or Firm* — Lerner David LLP

(57) ABSTRACT

The composite display apparatus includes multiple display devices each including a power supply having predetermined supply power and a power supply connection unit that connects the power supplies of the respective display devices to each other in parallel. The composite display apparatus is configured in such a manner that, in a case where at least one display device among the multiple display devices requires electric power exceeding the predetermined supply power of the power supply of the display device, electric power is supplied to the display device from the power supply of the other display device or devices. The present technology can be applied, for example, to a multi-display apparatus and so forth.

8 Claims, 12 Drawing Sheets

COMPOSITE DISPLAY APPARATUS AND CONTROLLING METHOD THEREFOR

CROSS-REFERENCE TO RELATED APPLICATIONS

This application is a national phase entry under 35 U.S.C. § 371 of International Application No. PCT/JP2021/018333 filed May 14, 2021, which claims the priority from Japanese Patent Application No. 2020-091971 filed in the Japanese Patent Office on May 27, 2020, the entire contents of which are hereby incorporated by reference.

TECHNICAL FIELD

The present technology relates to a composite display apparatus and a controlling method therefor, and particularly to a composite display apparatus that includes multiple display devices each including a power supply and that makes it possible to achieve reduction in size and reduction in cost of the power supplies and a controlling method for the composite display apparatus.

BACKGROUND ART

A multi-display apparatus is known in which a large screen formed by arranging multiple display devices contiguously to each other is used as a single display apparatus to display one video (for example, refer to PTL 1).

CITATION LIST

Patent Literature

[PTL 1]
Japanese Patent Laid-Open No. 2001-188524

SUMMARY

Technical Problem

In the multi-display apparatus described above, power consumptions of the individual display devices arranged contiguously may not necessarily be same as each other. Even in a case where it is obvious that the individual display devices do not operate simultaneously with maximum loads that are consumable by the individual display devices, it is necessary for the multi-display apparatus to include power supply devices that are ready for the maximum loads. Therefore, when the aggregation of the multiple display devices is regarded as a single apparatus, the apparatus has power supplies that are redundant with respect to the maximum load that can be consumed by the apparatus.

The present technology has been made in view of such a situation as described above and enables achievement of reduction in size and reduction in cost of power supplies in a composite display apparatus that includes multiple display devices each including a power supply.

Solution to Problem

A composite display apparatus according to one aspect of the present technology is an apparatus including multiple display devices each including a power supply having predetermined supply power and a power supply connection unit that connects the power supplies of the respective display devices to each other in parallel. In a case where at least one display device among the multiple display devices requires electric power exceeding the predetermined supply power of the power supply of the display device, electric power is supplied to the display device from the power supply of the other display device or devices.

A controlling method for a composite display apparatus according to one aspect of the present technology is a controlling method for a composite display apparatus that includes multiple display devices each including a power supply having predetermined supply power and a power supply connection unit that connects the power supplies of the respective display devices to each other in parallel. The controlling method includes causing, in a case where a first display device among the multiple display devices requires electric power exceeding the predetermined supply power of the power supply of the first display device, a second display device among the multiple display devices to supply electric power to the first display device.

In one aspect of the present technology, in the composite display apparatus that includes multiple display devices each including a power supply having predetermined supply power and a power supply connection unit that connects the power supplies of the respective display devices to each other in parallel, in a case where a first display device among the multiple display devices requires electric power exceeding the predetermined supply power of the power supply of the first display device, electric power is supplied from a second display device among the multiple display devices to the first display device.

The composite display apparatus may be an independent apparatus or may be an internal block included in one equipment.

DESCRIPTION OF EMBODIMENTS

In the following, modes for carrying out the present technology (hereinafter referred to as embodiments) are described with reference to the accompanying drawings. It is to be noted that, in the present specification and the drawings, components having substantially the same functional configurations are denoted by the same reference signs, and overlapping description of them is omitted. The description is given in the following order.
1. Functions Implemented by Multi-display Apparatus to Which Present Technology Is Applied
2. Block Diagram of Multi-display Apparatus to Which Present Technology Is Applied
3. First Configuration Example of Multi-display Apparatus
4. Second Configuration Example of Multi-display Apparatus
5. Example of Configuration of Composite Apparatus to Which Present Technology Is Applied

1. Functions Implemented by Multi-Display Apparatus to which Present Technology is Applied The present technology can be applied, for example, to a multi-display apparatus (composite display apparatus) in which multiple display devices cooperate with each other to display a predetermined video.

Now, functions implemented by a multi-display apparatus to which the present technology is applied are described with reference to FIGS. 1 to 6.

First, as a comparative example, a general multi-display apparatus is described, and thereafter, functions that are implemented by the multi-display apparatus to which the present technology is applied are described.

A multi-display apparatus includes multiple display devices arranged contiguously to each other in at least one of a vertical direction or a horizontal direction, and a large screen formed by a combination of the multiple display devices is used as a single display apparatus to display one video.

Figure 1:
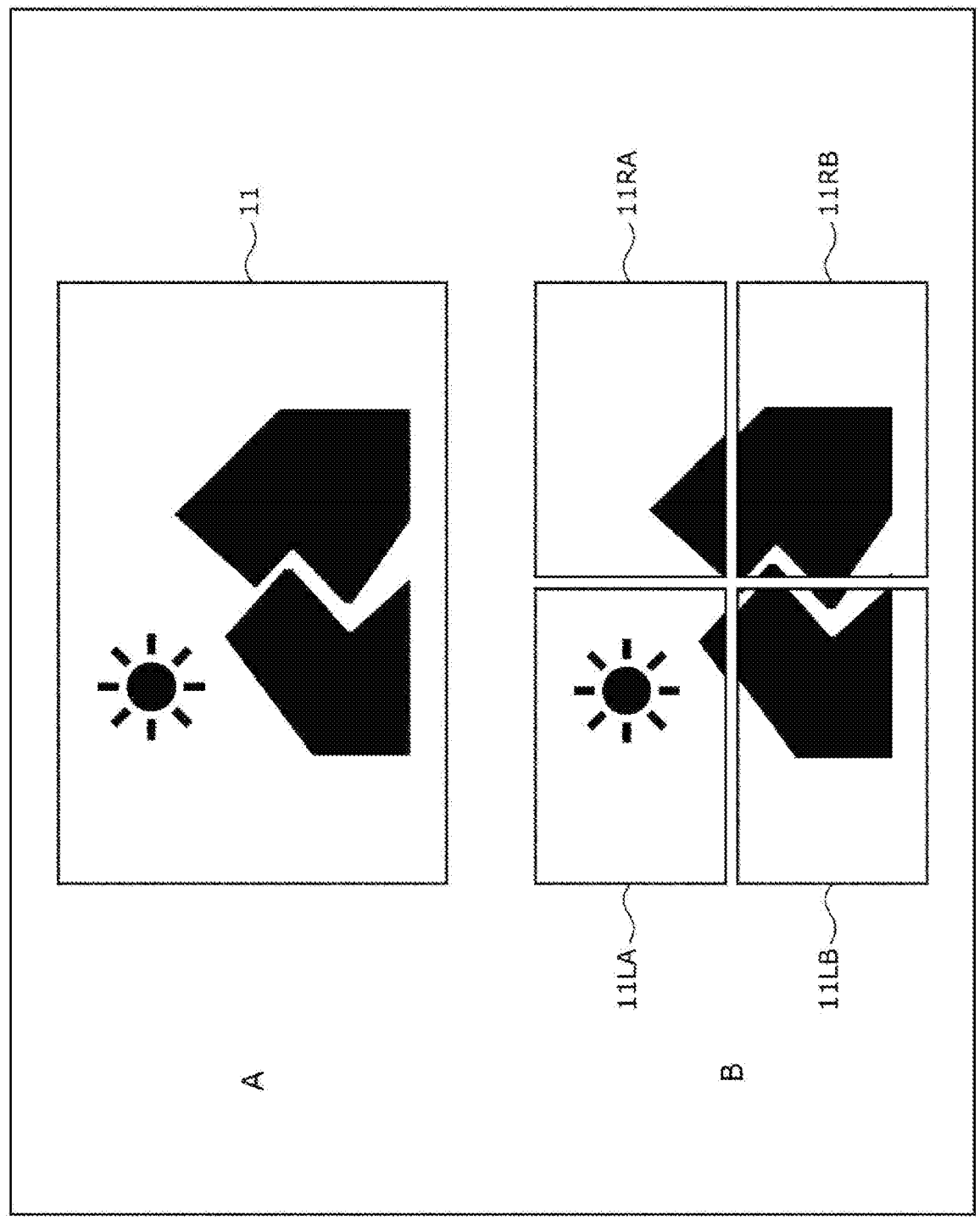
FIG. 1 is a view depicting an example of video displaying by a multi-display apparatus.

For example, in a case where the multi-display apparatus includes four display devices arranged in 2×2, the multi-display apparatus displays a video 11 depicted in A of FIG. 1 by causing the four display devices to individually display videos 11RA, 11LA, 11RB, and 11LB depicted in B of FIG. 1.

Figure 2:
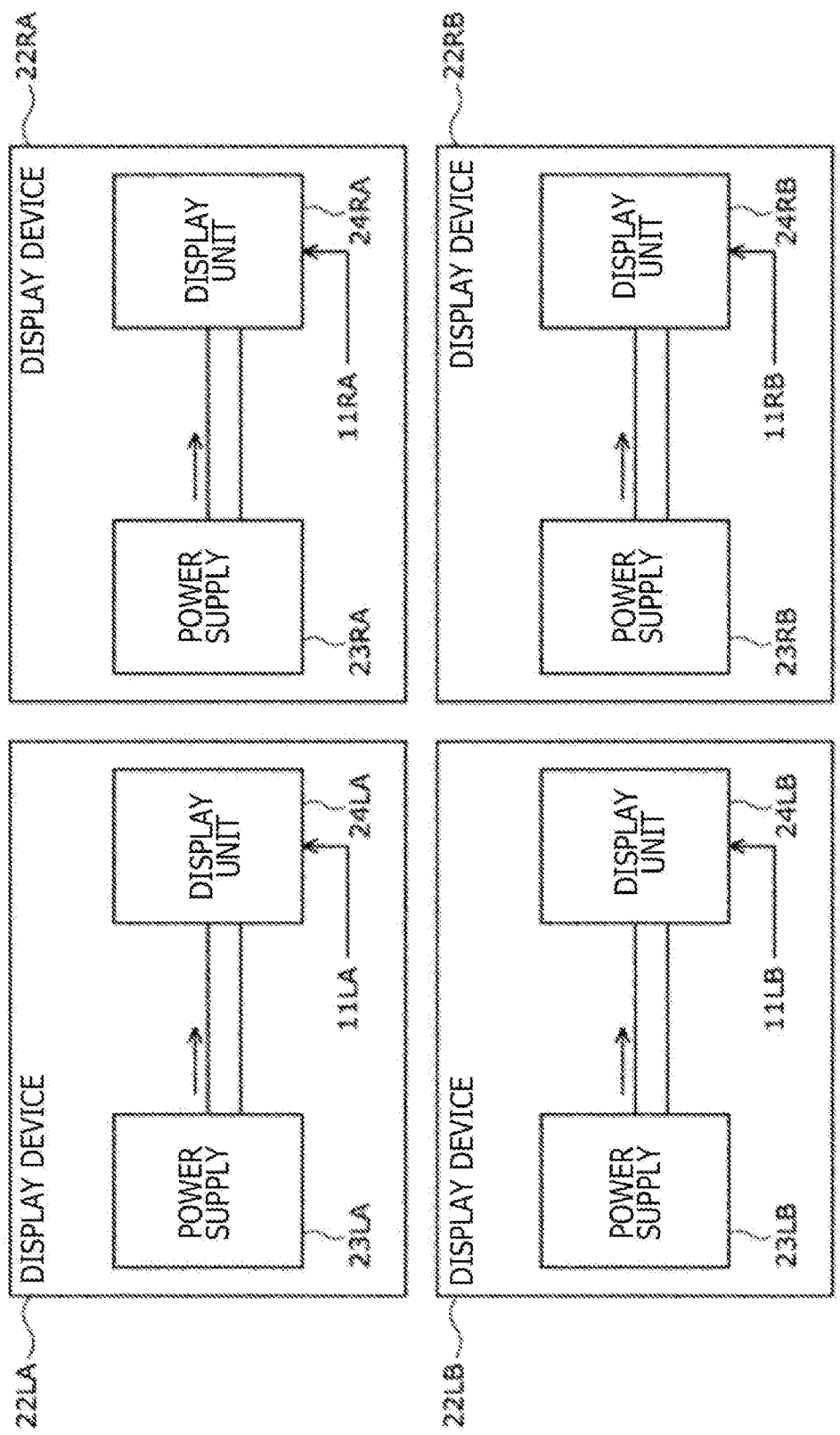
FIG. 2 is a block diagram depicting an example of a configuration of a general multi-display apparatus as a comparative example.

FIG. 2 is a block diagram depicting an example of a configuration of a multi-display apparatus that can display the video 11 depicted in FIG. 1 and that is a general multi-display apparatus.

A multi-display apparatus 21 of FIG. 2 includes four display devices 22RA, 22LA, 22RB, and 22LB.

The four display devices 22RA, 22LA, 22RB, and 22LB are identical display devices 22 each including a power supply 23 and a display unit 24. The power supplies 23 and the display units 24 of the display devices 22RA, 22LA, 22RB, and 22LB are denoted by similar reference signs in such a manner that they are referred to as a power supply 23RA and a display unit 24RA, a power supply 23LA and a display unit 24LA, a power supply 23RB and a display unit 24RB, and a power supply 23LB and a display unit 24LB.

The display unit 24RA of the display device 22RA arranged in the upper right displays the video 11RA, and the display unit 24LA of the display device 22LA arranged in the upper left displays the video 11LA. The display unit 24RB of the display device 22RB arranged in the lower right displays the video 11RB, and the display unit 24LB of the display device 22LB arranged in the lower left displays the video 11LB.

The display devices 22 making up the multi-display apparatus 21 each include the power supply 23 that supplies electric power necessary for driving the display unit 24. Here, it is assumed that the maximum power the power supply 23 of each display device 22 can supply is 100 W and the maximum luminance B when the display unit 24 is driven to emit light from an overall area thereof is 100 (B=100).

Figure 3:
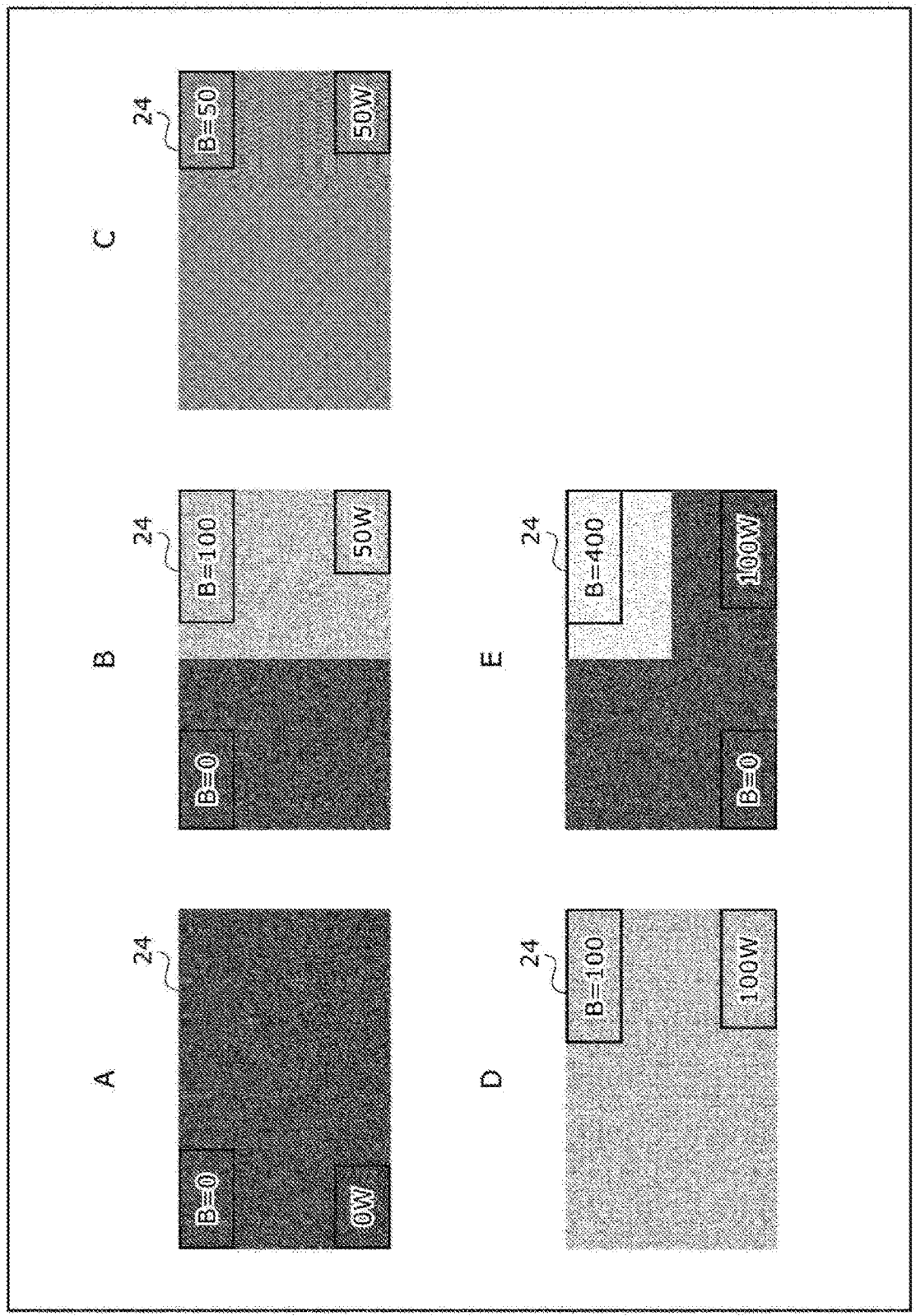
FIG. 3 is a view depicting a relation between a light emission luminance and a power consumption of a single display device.

FIG. 3 is a view depicting a relation between the light emission luminance and the power consumption of a single display device 22.

In a case where the display unit 24 does not emit light, the luminance B of the display unit 24 is B=0 and the power consumption is 0 W as depicted in A of FIG. 3.

In a case where one half area on one side of the display unit 24 is caused to emit light with its maximum luminance B=100 while the remaining half area thereof does not emit light (luminance B=0) as depicted in B of FIG. 3, the power consumption is 50 W.

Further, also in a case where the overall area of the display unit 24 is caused to emit light with one half luminance B=50 as depicted in C of FIG. 3, the power consumption is 50 W.

In a case where the overall area of the display unit 24 is caused to emit light with the maximum luminance B=100 as depicted in D of FIG. 3, the power consumption is 100 W.

Further, if the display area of the display unit 24 is limited to ¼ and the maximum power of 100 W is used as depicted in E of FIG. 3, then the display unit 24 can emit light with the luminance B=400 that is four times the luminance at the time of light emission from the overall area.

Figure 4:
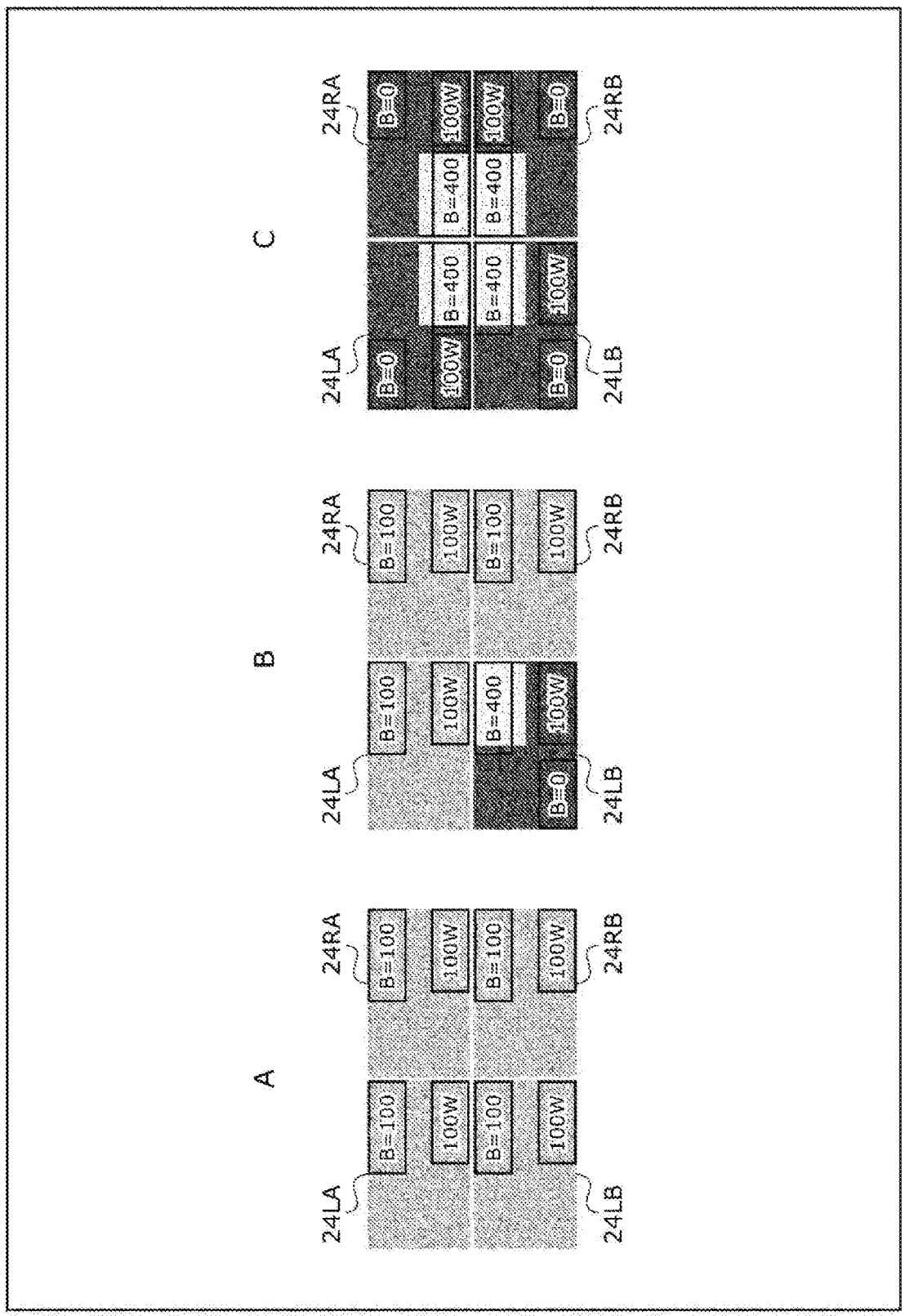
FIG. 4 is a view depicting a relation between the light emission luminance and the power consumption of an entire multi-display apparatus.

FIG. 4 is a view depicting a relation between the light emission luminance and the power consumption of the entire multi-display apparatus 21 including the four display devices 22.

The multi-display apparatus 21 includes the display devices 22 of the same configuration arrayed in 2×2, and therefore, each of the four display devices 22 can display a video with the display capability of a single device described hereinabove with reference to FIG. 3.

For example, it is possible to cause each of the four display devices 22 to emit light with the maximum luminance B=100 from the overall area of the display unit 24 as depicted in A of FIG. 4.

Further, for example, it is possible to cause three of the display devices 22 to emit light with the maximum luminance B=100 from the overall area of the display unit 24 and cause the remaining one display device 22 to emit light with the luminance B=400, which is four times the luminance upon light emission from the overall area, from ¼ of the display area of the display unit 24, as depicted in B of FIG. 4.

Further, for example, it is possible to cause all of the four display devices 22 to emit light with the luminance B=400, which is four times the luminance upon light emission from the overall area, from ¼ of the display area of the display unit 24 in such a manner that light emission is performed with the high luminance B=400 from a central display area corresponding to ¼ of the large screen, as depicted in C of FIG. 4.

In this manner, even if the four display devices 22 are combined to display a video, the relation between the light emission luminance and the power consumption of the single display device 22 is decided originally as described hereinabove with reference to FIG. 3.

Figure 5:
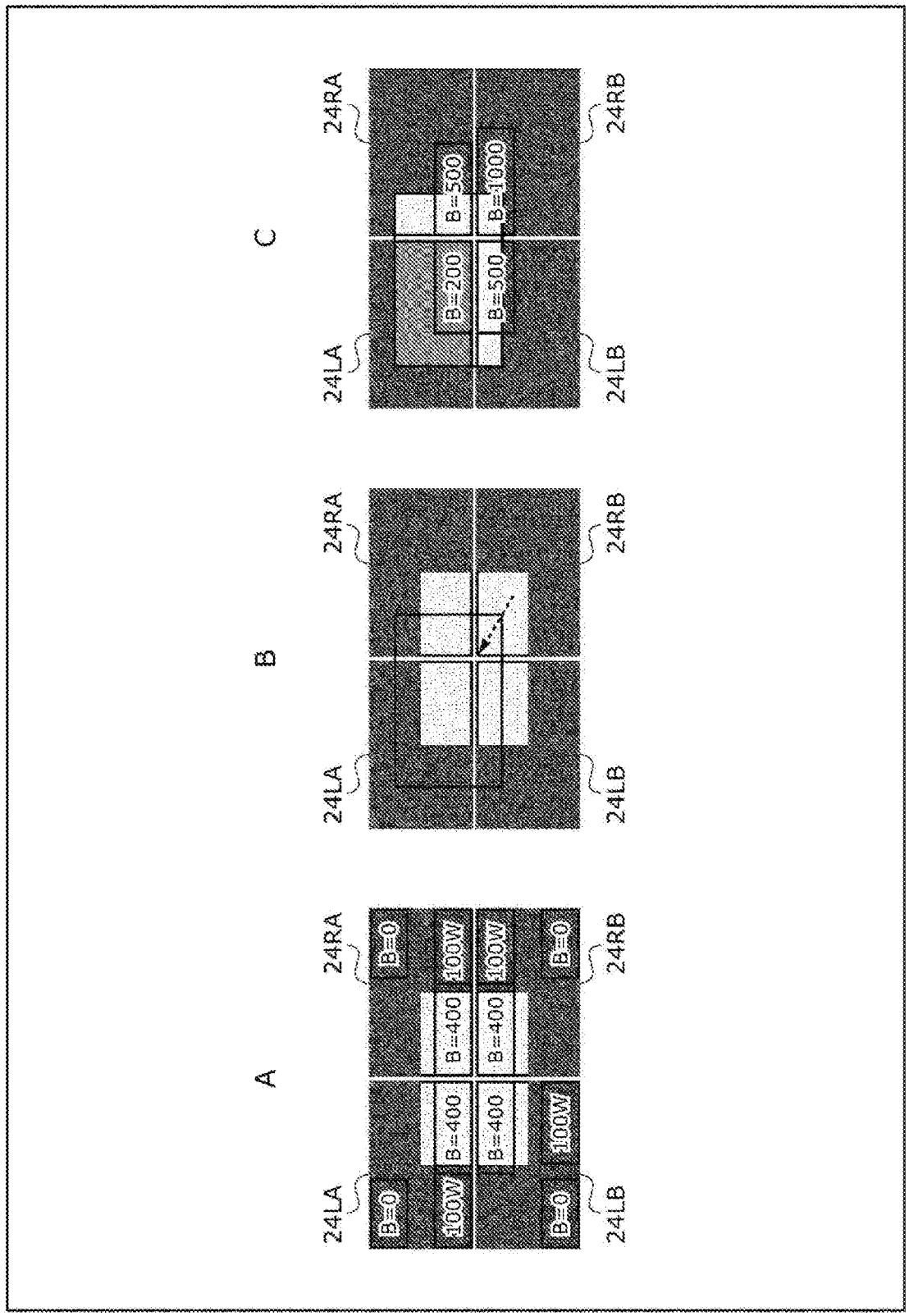
FIG. 5 is a view depicting an example of video displaying that appears on the multi-display apparatus of the comparative example.

Accordingly, for example, in a case where such displaying is performed in such a manner as to move a video, in which light is emitted with the high luminance B=400 from ¼ of the display area of the large screen as depicted in A of FIG. 5, to the display unit 24LA side of the display device 22LA as depicted in B of FIG. 5, since the display area for which the display unit 24LA is responsible exceeds ¼, light emission with the high luminance B=400 cannot be maintained, so that the luminance drops to a luminance B of light that can be emitted with the maximum power of 100 W by one display device 22 as depicted in C of FIG. 5. For example, the luminance B of the display area of the display unit 24LA drops to 200 (B=200). On the other hand, the display units 24RA, 24RB, and 24LB in which display areas for which they are responsible are smaller than ¼ can emit light within a range of the maximum power of 100 W, and the luminance B of light that can be emitted increases to 500 (B=500), 1000 (B=1000), and 500 (B=500), respectively.

In this manner, in the general multi-display apparatus 21, since the light emission capability of one display device 22 is decided originally, even if multiple display devices 22 are combined, failure of the display luminance occurs depending upon the balance of display videos of the display devices 22. In displaying of a moving image, it is highly possible that a display target that requires a high luminance moves not only in the central region of the large screen of FIG. 5 but also within the large screen as depicted in C of FIG. 5. In a case where the display area of a video becomes one-sided as depicted in C of FIG. 5, the multi-display apparatus 21 prevents failure of the display luminance, for example, by adjusting the luminances of the display units 24RA, 24RB, and 24LB to the maximum luminance B=200 of the display unit 24LA.

Figure 6:
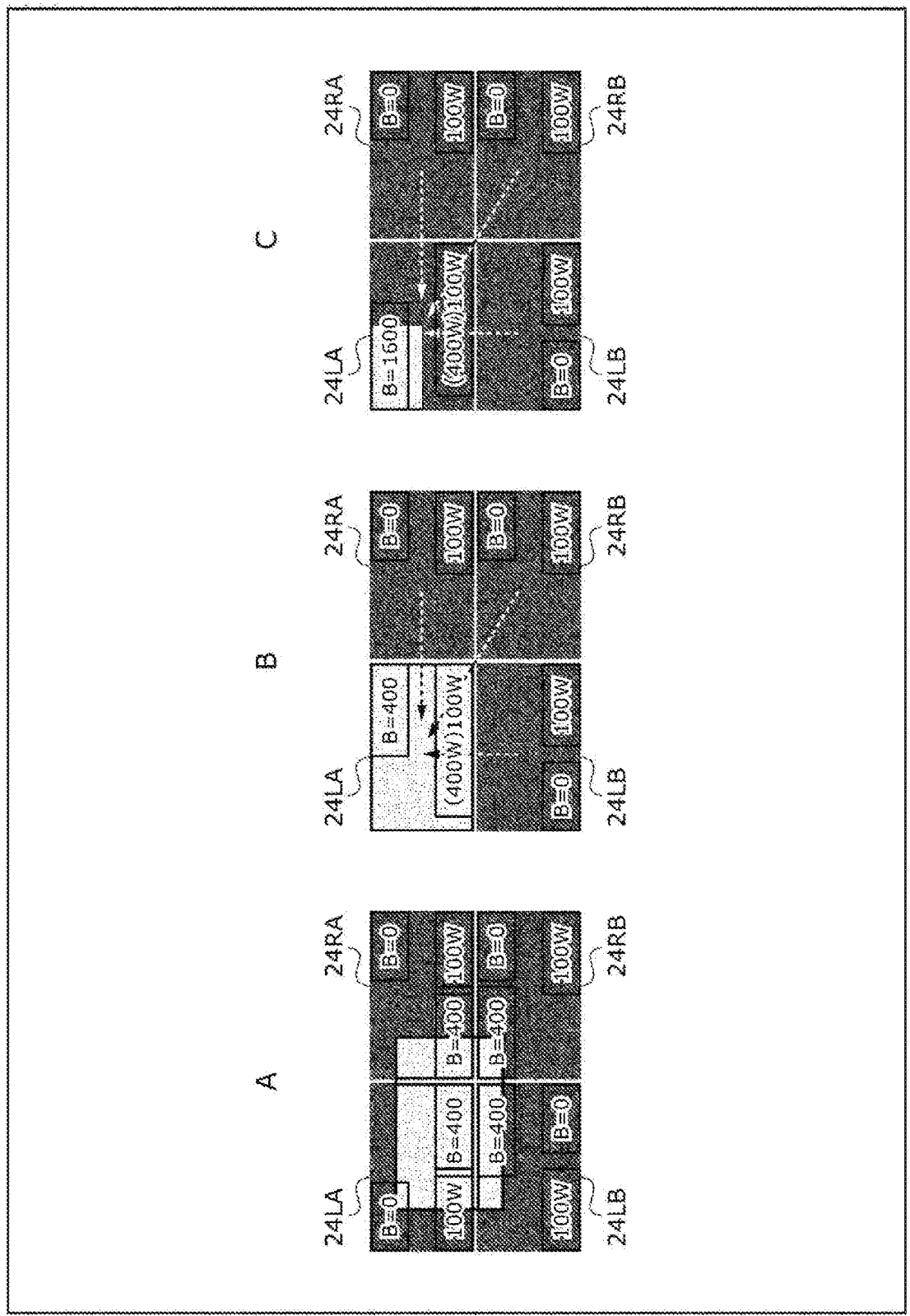
FIG. 6 is a view depicting examples of video displaying by a multi-display apparatus to which the present technology is applied.

In contrast, FIG. 6 depicts examples of video displaying on the large screen of a multi-display apparatus 41 that is a multi-display apparatus to which the present technology is applied and that is hereinafter described with reference to FIG. 7. It is to be noted that reference signs of the display units of FIG. 6 coincide with the reference signs of the multi-display apparatus 21.

A of FIG. 6 depicts an example of displaying in a case where a video same as that in C of FIG. 5 is displayed on the multi-display apparatus 41 hereinafter described.

The multi-display apparatus 41 can cause the display unit 24LA to perform, even in a case where the display area for which the display unit 24LA is responsible exceeds ¼ as depicted in C of FIG. 5, emission of light with the high luminance B=400 as depicted in A of FIG. 6 by receiving supply of power from the other display units 24RA, 24RB, and 24LB that have smaller display areas. Also in each of the display units 24RA, 24RB, and 24LB, the display area is narrower than ¼, and thus, emission of light with the high luminance B=400 is possible. As a result, the entire four screens can perform displaying in such a manner as to cause the display area corresponding to ¼ of the large screen to emit light with the high luminance B=400.

It is also possible for the multi-display apparatus 41, for example, to perform displaying in such a manner as to cause the overall area of the display unit 24LA to emit light with the four-time luminance B=400 by causing the three display units 24RA, 24RB, and 24LB to emit no light and supplying electric power for them to the remaining one display unit 24LA, as depicted in B of FIG. 6.

Further, in a case where displaying is limited to ¼ of the display area of the one display unit 24LA as depicted in C of FIG. 6, it is also possible for the multi-display apparatus 41 to cause the ¼ display area of the display unit 24LA to emit light with a luminance B=1600, which is 16 times the luminance upon light emission from the overall area of the display unit 24LA.

In this manner, by incorporating a power sharing function for regarding electric power of the respective power supplies of the multiple display devices that operate in a cooperative manner as a totaling one power supply and distributing the electric power to the individual display devices as occasion demands, the multi-display apparatus 41 hereinafter described can perform high-luminance displaying that cannot be implemented by the multi-display apparatus 21 described hereinabove.

It is to be noted that, although the example in FIG. 6 is an example in which the number of display devices making up the multi-display apparatus 41 is four, the number of display devices is not limited to four. For example, in a case where the number of display devices making up the multi-display apparatus 41 is N (N>1) and light emission is concentrated on the overall area of one display unit as depicted in B of FIG. 6, displaying with a light emission luminance equal to N times the luminance in the case of using only one display device is possible. Further, in a case where the number of display devices making up the multi-display apparatus 41 is N (N>1) and light emission is concentrated on a display area corresponding to 1/M (M>1) of only one of the display devices, displaying with a light emission luminance equal to N×M times the luminance in the case of using only one display device is possible.

In the following, a particular configuration of a multi-display apparatus having the power sharing function depicted in FIG. 6 is described.

2. Block Diagram of Multi-Display Apparatus to which Present Technology is Applied FIG. 7 is a block diagram depicting an example of a configuration of a multi-display apparatus to which the present technology is applied.

Figure 7:
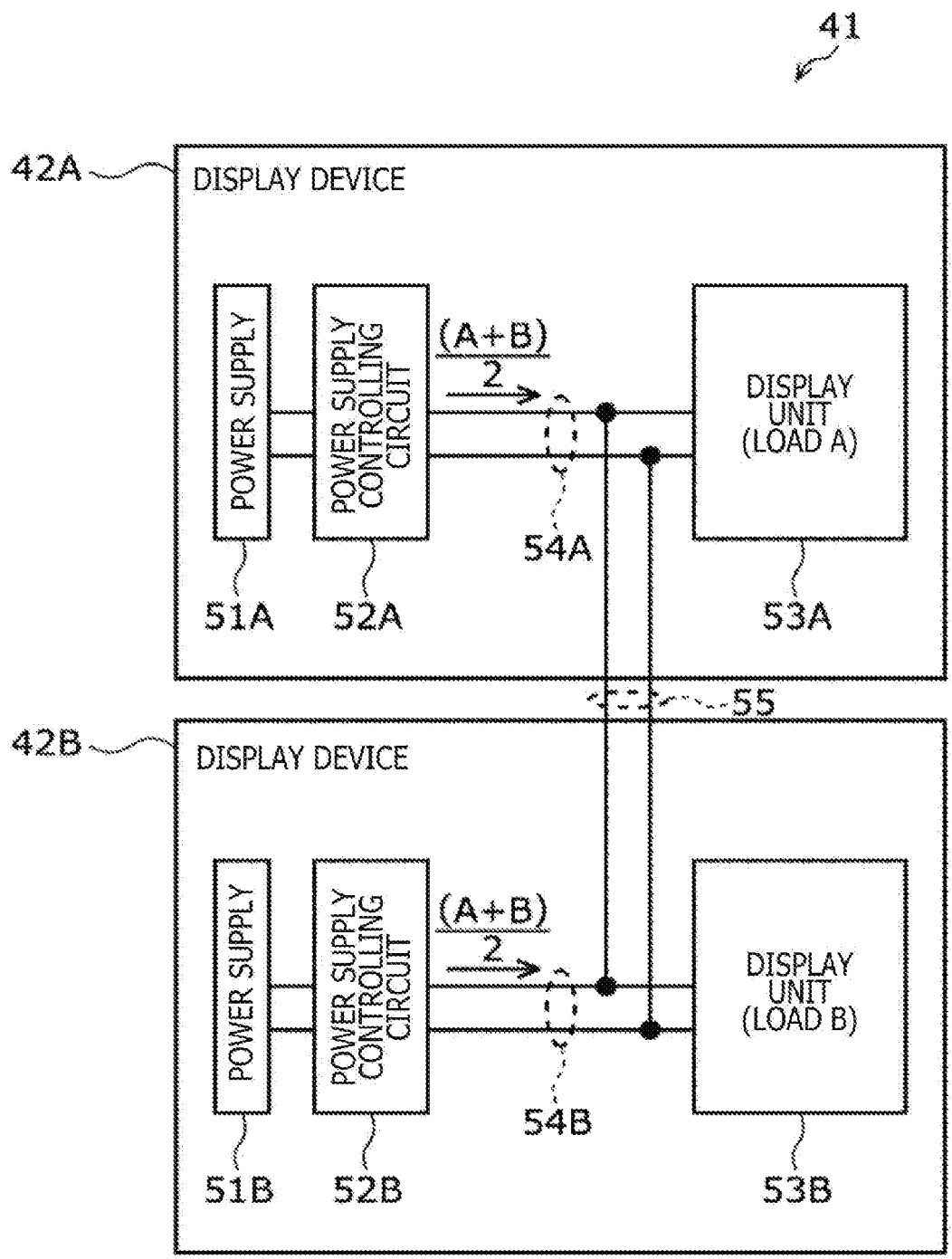
FIG. 7 is a block diagram depicting an example of a configuration of the multi-display apparatus to which the present technology is applied.

It is to be noted that, while an example in which a multi-display apparatus includes two display devices is depicted in FIG. 7 in order to simplify the description, the present technology can also be applied similarly in a case where the number of display devices is three or more.

The multi-display apparatus 41 of FIG. 7 includes two display devices 42 arranged contiguously in the vertical direction or the horizontal direction. In order to distinguish the two display devices 42 from each other, one of the display devices 42 is referred to as a display device 42A while the other display device 42 is referred to as a display device 42B.

The display devices 42 each include a power supply 51, a power supply controlling circuit 52, and a display unit 53. Accordingly, the display device 42A includes a power supply 51A, a power supply controlling circuit 52A, and a display unit 53A, and the display device 42B includes a power supply 51B, a power supply controlling circuit 52B, and a display unit 53B.

The power supply 51 (51A, 51B) has a capability of supplying predetermined electric power and supplies predetermined required electric power to the display unit 53 as a load through a power supply line 54 (54A, 54B).

The power supply controlling circuit 52 (52A, 52B) controls supply of electric power from the power supply 51 to the display unit 53.

The display unit 53 (53A, 53B) receives supply of electric power from the power supply 51 and displays a predetermined video on the basis of a video signal inputted thereto through a signal line not depicted. In the present embodiment, it is assumed that the display unit 53A and the display unit 53B have screen sizes equal to each other.

The power supply line 54A that connects the power supply 51A and the display unit 53A to each other in the display device 42A and the power supply line 54B that connects the power supply 51B and the display unit 53B to each other in the display device 42B are connected to each other by a power supply connection line 55. The power supply connection line 55 is a power supply connection unit that connects the power supply 51A of the display device 42A and the power supply 51B of the display device 42B in parallel.

In the multi-display apparatus 41 configured in such a manner as described above, outputs of the power supplies 51 of the two display devices 42 are controlled in such a manner that supply of electric power of the power supplies 51 is balanced.

The power supply 51 provided in each of the display devices 42 is a power supply having a supply capability lower than the maximum power that is consumed by the own display device 42. For example, although a video of a four-time luminance B=400 or a 16-time luminance B=160 can be displayed using the electric power of 400 W, for example, like the display device 42 in the upper left in B and C of FIG. 6, the power supply 51 provided in the display device 42 is a power supply having a supply capability of 100 W lower than 400 W.

In a case where the display device 42A requires electric power exceeding the supply capability of the power supply 51A of the display device 42A, that is, in a case where a video is to be displayed with a luminance higher than the luminance corresponding to the maximum value (100 W) of the supply power of the power supply 51A, electric power is supplied from the power supply 51B of the other display device 42B.

Although a load A of the display unit 53A and a load B of the display unit 53B each vary depending upon the video to be displayed thereon, the electric power supplied from each of the power supplies 51A and 51B is an average value (A+B)/2 of the load A and the load B.

3. First Configuration Example of Multi-Display Apparatus

Figure 8:
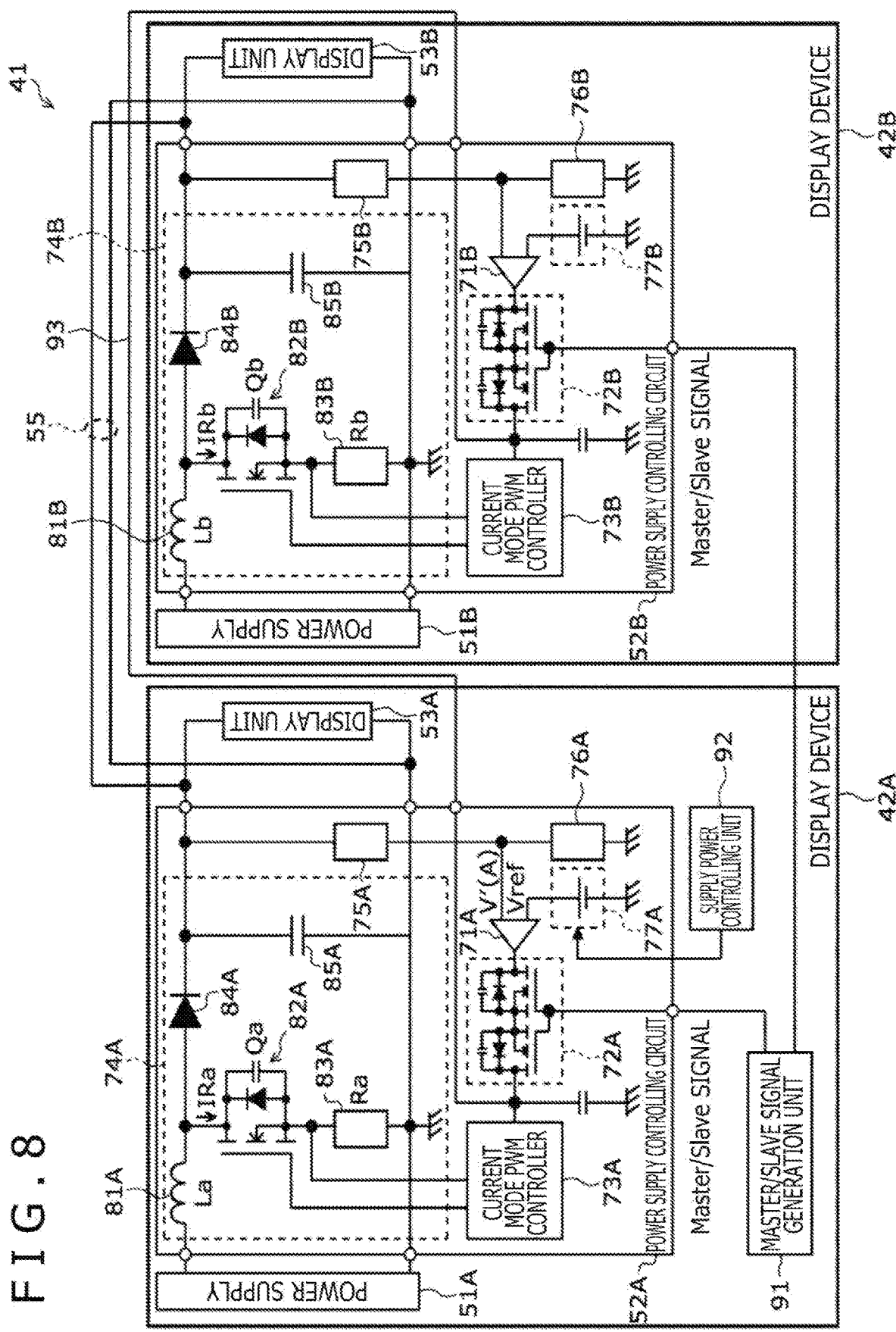
FIG. 8 is a view depicting details of a first configuration example of the multi-display apparatus of FIG. 7.

FIG. 8 depicts details of a first configuration example of the multi-display apparatus 41 of FIG. 7.

The display device 42A includes the power supply 51A, the power supply controlling circuit 52A, and the display unit 53A as described hereinabove.

The power supply controlling circuit 52A includes a voltage error amplifier 71A, a bidirectional switch 72A, a current mode PWM controller 73A, a converter 74A, resistors 75A and 76A, and a target voltage generation unit 77A.

The converter 74A is a DC-DC converter that converts a first voltage $V_E\_A$ (power supply voltage $V_E\_A$) supplied from the power supply 51A into a second voltage $V_O\_A$ on the basis of a PWM (Pulse Width Modulation) signal from the current mode PWM controller 73A and outputs the second voltage $V_O\_A$. More specifically, the converter 74A is configured as a boost chopper circuit that includes an inductor 81A, a MOS-FET 82A, a resistor 83A, a diode 84A, and a capacitor 85A and boosts a first voltage $V_E$ to a second voltage $V_O$ by turning on and off the MOS-FET 82A of the N-channel type that serves as a switching element. Here, an inductance of the inductor 81A is La, a stored charge of a parasitic capacitance of the MOS-FET 82A is Qa, and a resistance value of the resistor 83A is Ra.

The display device 42B is also configured in a manner similar to the display device 42A, and therefore, description thereof is omitted. Here, the converter 74B converts a first voltage $V_E\_B$ (power supply voltage $V_E\_B$) supplied from the power supply 51B into a second voltage $V_O\_B$ and outputs the second voltage $V_O\_B$. It is to be noted that the inductance of the inductor 81B is Lb, the stored charge of the parasitic capacitance of the MOS-FET 82B is Qb, and the resistance value of the resister 83B is Rb.

In a case where the screen sizes of the display unit 53A and the display unit 53B are equal to each other, the inductances La and Lb of the inductors 81A and 81B are set to values equal to each other (La=Lb), and also the resistance values Ra and Rb of the resistors 83A and 83B are set to values equal to each other (Ra=Rb).

In the multi-display apparatus 41 according to the first configuration example depicted in FIG. 7, one of the two display devices 42A and 42B operates as a master that controls supply of electric power of all power supplies 51 of the multi-display apparatus 41 while the other operates as a slave that is controlled by the master. It is to be noted that, in a case where the multi-display apparatus 41 includes three or more display devices 42, a predetermined one of the display devices 42 operates as a master while the remaining display devices 42 operate as slaves.

The multi-display apparatus 41 includes at least one master/slave signal generation unit 91 and at least one supply power controlling unit 92. The master/slave signal generation unit 91 and the supply power controlling unit 92 may be provided separately from the multiple display devices 42 or may be configured in such a manner that, for example, they are provided in each display device 42 and the master/slave signal generation unit 91 and the supply power controlling unit 92 of the display device 42 that operates as a master are set to a valid state to operate. It is assumed that, in the present embodiment, the master/slave signal generation unit 91 and the supply power controlling unit 92 of the display device 42A are set to the valid state to operate.

The master/slave signal generation unit 91 generates a master/slave signal for controlling whether the power supply controlling circuit 52 of each display device 42 is to operate as a master or operate as a slave, and supplies the master/slave signal to the power supply controlling circuit 52 of each display device 42.

In the present embodiment, since the display device 42A operates as a master and the display device 42B operates as a slave, a master signal is supplied to the power supply controlling circuit 52A of the display device 42A while a slave signal is supplied to the power supply controlling circuit 52B of the display device 42B.

The supply power controlling unit 92 calculates a target voltage Vref necessary for a video to be displayed on all the display units 53 of the multi-display apparatus 41 and supplies the target voltage Vref to the target voltage generation unit 77A. For example, in a case where a video to be displayed on all the display units 53 is a dark image, in order to cause all the display units 53 to emit light with a low light emission luminance, the target voltage Vref is low. On the other hand, in a case where a video to be displayed on all the display units 53 is a bright image, in order to cause all the display units 53 to emit light with a high light emission luminance, the target voltage Vref is high.

The master/slave signal outputted from the master/slave signal generation unit 91 is supplied to the bidirectional switch 72 of the power supply controlling circuit 52 in each display device 42. The bidirectional switch 72 includes two N-channel MOS-FETs connected in what is generally called back-to-back connection to each other, and the master/slave signal is supplied to the gate of the N-channel MOS-FETs. The master signal indicating that the power supply controlling circuit 52 is to operate as a master is a High signal that turns on the bidirectional switch 72, and is supplied to the bidirectional switch 72A. The slave signal indicating that the power supply controlling circuit 52 is to operate as a slave is a Low signal that turns off the bidirectional switch 72, and is supplied to the bidirectional switch 72B.

In the power supply controlling circuit 52A of the display device 42A in which the bidirectional switch 72A is turned on, an output of the voltage error amplifier 71A is validated. On the other hand, in the power supply controlling circuit 52B of the display device 42B in which the bidirectional switch 72B is turned off, an output of the voltage error amplifier 71B is invalidated. Consequently, the outputs of the voltage error amplifiers 71A and 71B are prevented from interfering with each other.

It is to be noted that the bidirectional switches 72 are not limited to those having a configuration of two MOS-FETs connected back-to-back to each other and may have any configuration only if the output thereof can be bidirectionally turned on and off.

To a first input of the voltage error amplifier 71A, a value obtained by dividing the second voltage $V_O\_A$, which is an output voltage of the converter 74A, between the resistor 75A and the resistor 76A is inputted as a first input voltage V'(A). Meanwhile, to a second input of the voltage error amplifier 71A, a target voltage Vref generated by the target voltage generation unit 77A is inputted as a second input voltage Vref. The target voltage generation unit 77A generates the target voltage Vref set from the supply power controlling unit 92 and supplies the generated target voltage Vref to the voltage error amplifier 71A.

The voltage error amplifier 71A calculates a differential voltage Vfb between the first input voltage V'(A) and the second input voltage Vref and outputs the calculated differential voltage Vfb to the bidirectional switch 72A. For example, if the target voltage Vref is 2 V, the output voltage of the converter 74A is 100 V, and the voltage division ratio between the resistor 75A and the resistor 76A is 1/40, then the first input voltage V'(A) becomes 2.5 V, and the difference 0.5 V between 2 V and 2.5 V is outputted as the differential voltage Vfb of an analog value.

The differential voltage Vfb that is the output of the voltage error amplifier 71A is supplied to the current mode PWM controller 73A via the bidirectional switch 72A that is in an on state, and is supplied also to the current mode PWM controller 73B of the power supply controlling circuit 52B of the display device 42B that is a slave through a connection line 93.

Figure 9:
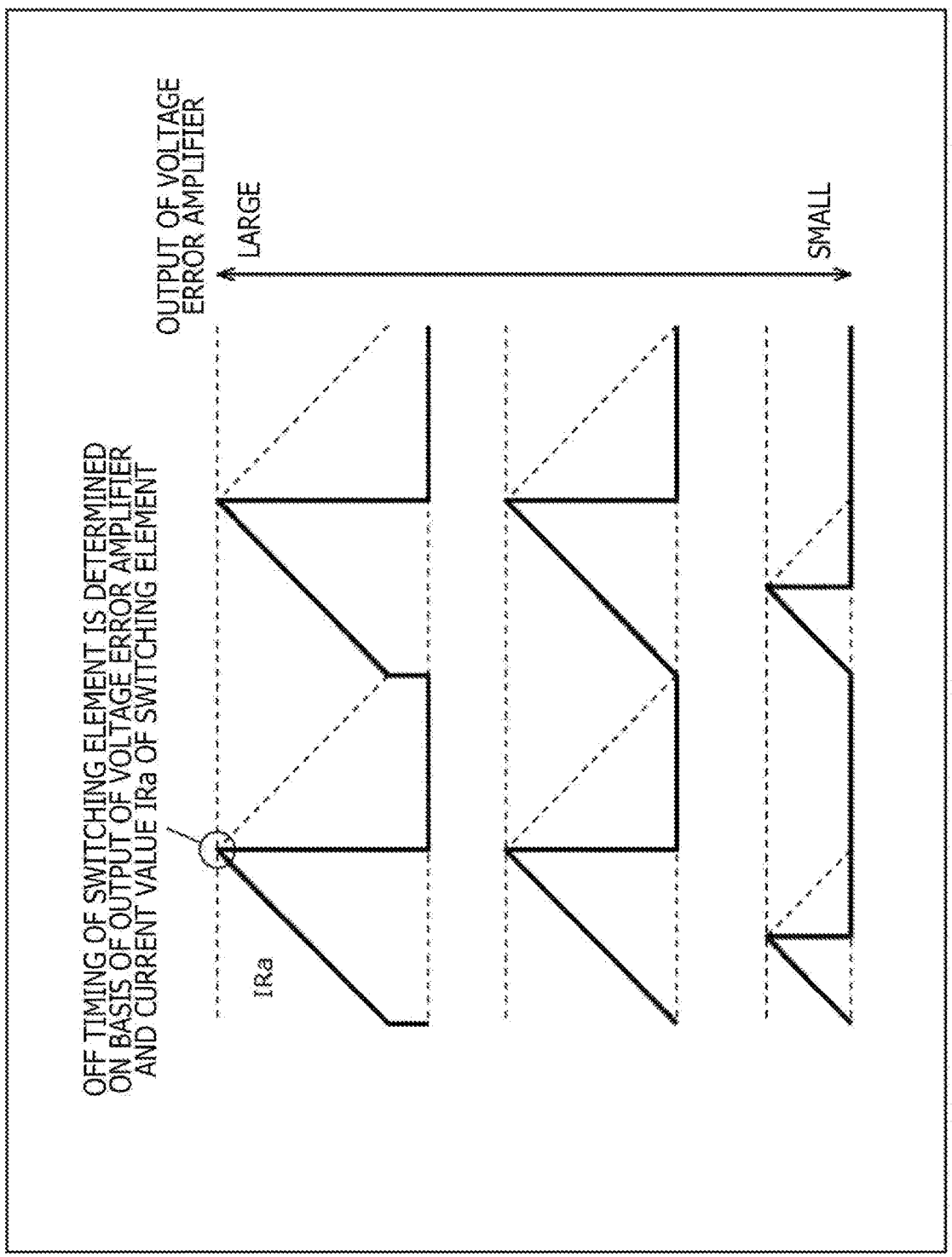
FIG. 9 is a view depicting a relation between a differential voltage that is an output of a voltage error amplifier and a value of a current flowing through a MOS-FET.

The current mode PWM controller 73A supplies a PWM signal generated on the basis of the differential voltage Vfb from the voltage error amplifier 71A to the gate of the MOS-FET 82A of the converter 74A, to thereby turn the MOS-FET 82A on or off.

Where the value of a current flowing through the MOS-FET 82A is IRa, when the MOS-FET 82A is turned on, the relation between the differential voltage Vfb that is the output of the voltage error amplifier 71A and the current value IRa flowing through the MOS-FET 82A is such as depicted in FIG. 9.

The current mode PWM controller 73A turns on and off the MOS-FET 82A by using, as a target value, a value that varies in proportion to the differential voltage Vfb that is the output of the voltage error amplifier 71A. The current mode PWM controller 73A controls the MOS-FET 82A between on and off in such a manner that, when the differential voltage Vfb is large, the current value IRa flowing through the MOS-FET 82A that is a switching element is high, but when the differential voltage Vfb is small, the current value IRa flowing through the MOS-FET 82A that is a switching element is low, as depicted in FIG. 9. If the current value IRa flowing through the MOS-FET 82A increases until it reaches the output of the voltage error amplifier 71A, then the current mode PWM controller 73A controls the MOS-FET 82A to be turned off.

That is, the converter 74A is a current mode-controlled power supply circuit that switching-controls the current flowing through the MOS-FET 82A to thereby convert the first voltage $V_{E\_}A$ into the second voltage $V_O\_A$ to be outputted.

In this manner, the power supply controlling circuit 52A controls the current value IRa flowing through the MOS-FET 82A on the basis of the output from the voltage error amplifier 71A that outputs the differential voltage Vfb between the division voltage V'(A) of an actual output voltage (second voltage $V_O\_A$) of the converter 74A and the target voltage Vref.

Further, the output of the voltage error amplifier 71A is supplied also to the current mode PWM controller 73B of the power supply controlling circuit 52B of the display device 42B, which is a slave, through the connection line 93. Accordingly, also in the power supply controlling circuit 52B, the current value IRb flowing through the MOS-FET 82B is controlled on the basis of the output from the voltage error amplifier 71A in a similar manner.

In both of the power supply controlling circuits 52A and 52B, the current value IRa flowing through the MOS-FET 82A and the current value IRb flowing through the MOS-FET 82B are controlled on the basis of the output from the one voltage error amplifier 71A. In the power supply controlling circuits 52A and 52B, since the inductances La and Lb of the inductors 81A and 81B are equal to each other (La=Lb) and the resistance values Ra and Rb of the resistors 83A and 83B are equal to each other (Ra=Rb), the current value IRa and the current value IRb become equal to each other. Consequently, supply of electric power from the power supply 51A (second voltage $V_O\_A$) and supply of electric power from the power supply 51B (second voltage $V_O\_B$) are controlled to be balanced.

According to the first configuration example of the multi-display apparatus 41 described above, each of the power supply controlling circuits 52 (52A and 52B) of the multiple display devices 42 (42A and 42B) acquires a control signal indicating whether the display device is to operate as a master or a slave. Then, the power supply controlling circuit 52A that acquires the master signal indicating that the display device is to operate as a master controls also the power supply controlling circuit 52B of the other display device 42B.

The power supply controlling circuit 52A, as the master, controls the output of the own power supply 51A and the output of the other power supply 51B in such a manner that supplies of electric power of the power supplies 51A and 51B of the two display devices 42A and 42B are balanced.

It is to be noted that, while the present embodiment described above is directed to a case in which the display unit 53A and the display unit 53B have screen sizes equal to each other, for example, in a case where the screen sizes of the display unit 53A and the display unit 53B are different from each other, similar control can be performed by setting the ratio between the inductances La and Lb and the ratio between the resistance values Ra and Rb to values according to the ratio between the power supplies 51 corresponding to the screen sizes. For example, by setting La=2Lb and Ra=2Rb, the ratio between the outputs of the power supply 51A and the power supply 51B can be set to 1:2.

4. Second Configuration Example of Multi-Display Apparatus

Figure 10:
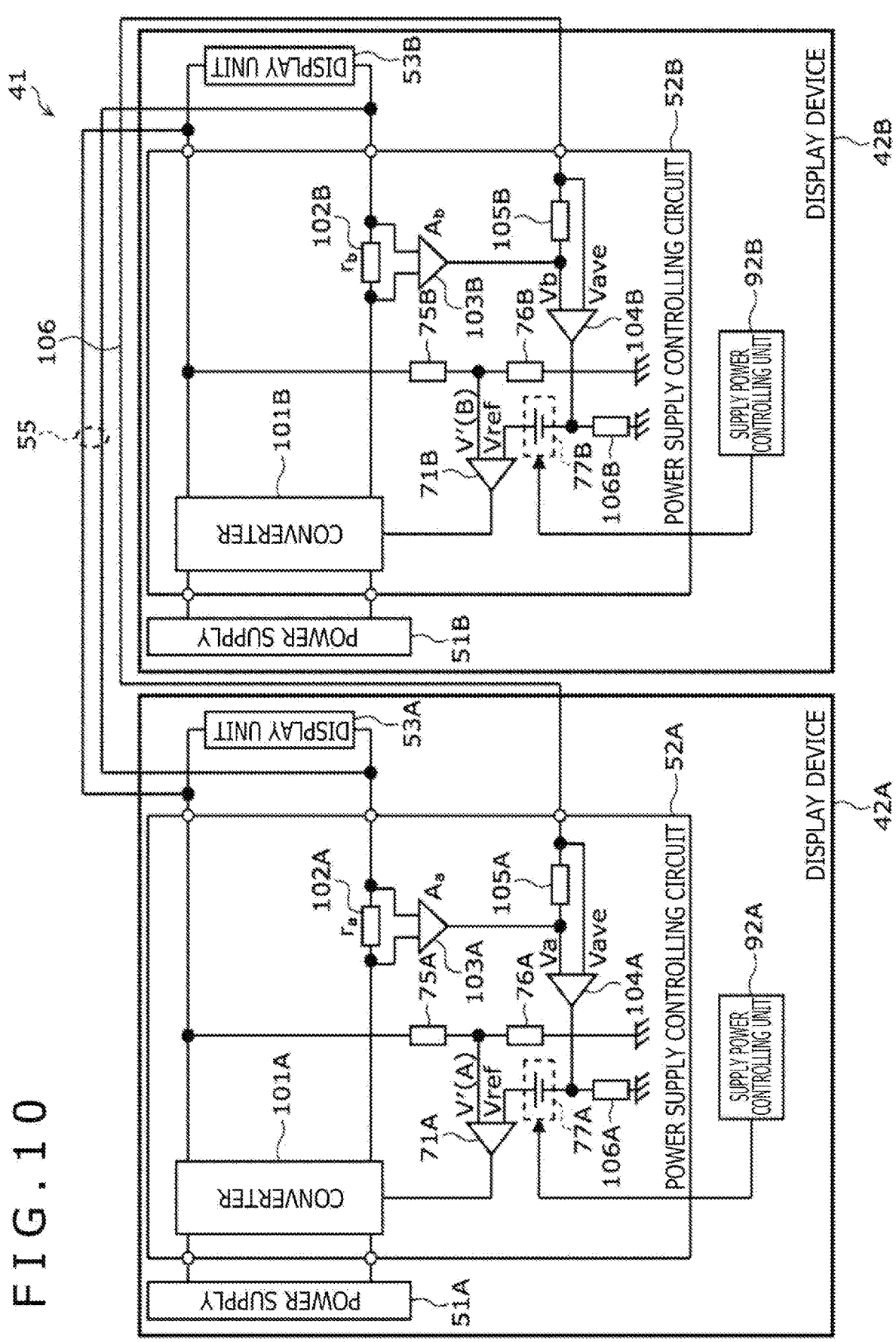
FIG. 10 is a view depicting details of a second configuration example of the multi-display apparatus of FIG. 7.

FIG. 10 depicts details of a second configuration example of the multi-display apparatus 41 of FIG. 7.

In FIG. 10, elements corresponding to those of the first configuration example depicted in FIG. 8 are denoted by the same reference signs, and description of them is omitted suitably.

In the second configuration example, the two display devices 42A and 42B have no such a master-slave relation as in the first configuration example, and the two display devices 42A and 42B have the same configuration. Therefore, in the following description, the display device 42A is described, and description of the display device 42B is suitably complemented.

The power supply controlling circuit 52A of the display device 42A includes a voltage error amplifier 71A that compares a first input voltage V'(A) obtained by voltage division between the resistor 75A and the resistor 76A and a second input voltage Vref generated by the target voltage generation unit 77A with each other and outputs a resulting differential voltage Vfb, as in the first configuration example. The display device 42A includes a supply power controlling unit 92A that calculates a target voltage Vref on the basis of a video to be displayed on the display unit 53A and supplies the target voltage Vref to the target voltage generation unit 77A.

Further, the power supply controlling circuit 52A includes a converter 101A that converts a first voltage $V_{E\_}A$ (power supply voltage $V_{E\_}A$) from the power supply 51A into a second voltage $V_{O\_}A$ on the basis of the output of the voltage error amplifier 71 and outputs the second voltage $V_{O\_}A$. The converter 101A may be a current mode-controlled converter as in the first configuration example or may be a different control type converter. In other words, in the second configuration example, the controlling method of the converter may be freely determined.

Further, the power supply controlling circuit 52A includes, on an output path of the converter 101A, a resistor 102A as a current detection element that detects a value of a current flowing through the display unit 53A as a load and converts the current value into a voltage and an amplifier 103A that amplifies the voltage obtained by the conversion. Here, the resistance value of the resistor 102A is $r_a$, and the amplification rate of the amplifier 103A is $A_a$.

Further, the power supply controlling circuit 52A includes a comparator 104A, which has a first input to which a voltage Va that is an output of the amplifier 103A is inputted and a second input to which an end point on the opposite side (the other end) of a resistor 105A connected at one end thereof to the output of the amplifier 103A is inputted.

The resistor 105A of the power supply controlling circuit 52A is connected to a resistor 105B of the power supply controlling circuit 52B of the display device 42B through a connection line 106, and a connection point between the resistor 105A and the resistor 105B is set as the second input of the comparator 104A of the power supply controlling circuit 52A. Therefore, to the second input, an average value Vave of the output voltage Va of the amplifier 103A of the power supply controlling circuit 52A and the output voltage Vb of the amplifier 103B of the power supply controlling circuit 52B is inputted.

The comparator 104A compares the output voltage Va of the amplifier 103A that is the first input and the average value Vave of the output voltages Va and Vb that is the second input with each other and outputs (a voltage of) a result of the comparison to a connection point between the target voltage generation unit 77A and a resistor 106A.

The power supply controlling circuit 52A of the display device 42A is configured in such a manner as described above, and also the power supply controlling circuit 52B of the display device 42B is configured in a manner similar to the power supply controlling circuit 52A. It is to be noted that, where the resistance value of the resistor 102B in the power supply controlling circuit 52B is represented by $r_b$ and the amplification rate of the amplifier 103B is represented by $A_b$, the resistance values and the amplification rates have respective relations of $r_a=r_b$ and $A_a=A_b$.

Operation of the power supply controlling circuit 52A described above is described. The comparator 104A compares the output voltage Va of the amplifier 103A, which is equivalent to a value of a current flowing through the output path of the converter 101A, and the average value Vave that is equivalent to an average value of current values flowing through the output paths of the converters 101A and 101B. Further, the supply of electric power (second voltage $V_{O\_}B$) from the power supply 51A is controlled on the basis of the comparison result of the comparator 104A. More specifically, in a case where the current value of the converter 101A is smaller than the average current value, the comparator 104A outputs (a voltage of) such a comparison result that raises the second input voltage Vref that is the target voltage of the voltage error amplifier 71, but in a case where the current value of the converter 101A is larger than the average current value, the comparator 104A outputs (a voltage of) such a comparison result that lowers the second input voltage Vref that is the target voltage of the voltage error amplifier 71.

Also the power supply controlling circuit 52B performs similar operation to perform such control as to make, in each of the power supply controlling circuits 52A and 52B, current values to be outputted from the converters 101A and 101B equal to each other. In short, the power supply controlling circuits 52A and 52B perform control of the current values in such a manner that the supply of electric power of the power supplies 51A and 51B in the respective display devices 42A and 42B is balanced.

It is to be noted that the resistance values and the amplification rates have respective relations of $r_a=r_b$ and $A_a=A_b$ in a case where the screen sizes of the display unit 53A and the display unit 53B are equal to each other. In a case where the screen sizes of the display unit 53A and the display unit 53B are different from each other, the ratio between the resistance values $r_a$ and $r_b$ and the ratio between the amplification rates $A_a$ and $A_b$ are changed according to the screen sizes (power supplies).

While it is described that, in the above-described embodiment, the power supply controlling circuit 52 is configured in such a manner as to control the power supplies 51 incorporated in the individual display devices 42 of the multi-display apparatus 41 in which the multiple display devices 42 operate cooperatively, the power supply controlling circuit 52 of the present technology can be applied to other apparatuses in addition to such a display apparatus. In particular, the power supply controlling circuit 52 described above can be applied to a power supply controlling apparatus that controls power supplies of multiple devices in a case where the multiple devices cooperatively making up the entire apparatus. For example, in a case where the power supply controlling circuit 52 is used in a charger, charging can be accelerated when the number of batteries connected is small.

In the first configuration example of the power supply controlling circuit 52 depicted in FIG. 8, since currents flowing through the respective converters 74 coincide with each other pulse by pulse, even in the case of a load whose variation is great and whose peak is great, it is possible to cause the peak load to be shared. Therefore, the first configuration example is suitable for the multi-display apparatus described above and so forth.

On the other hand, since the second configuration example of the power supply controlling circuit 52 of FIG. 10 is free from restriction in regard to the type of the converters 101, it can be applied to such an apparatus as a charger whose output variation is small, and the range choices for the converters 101 can be extended.

5. Configuration Example of Composite Apparatus to which Present Technology is Applied FIG. 11 is a block diagram depicting an example of a configuration of a composite apparatus in a case where the power supply control of the present technology described above is applied to a composite apparatus whose use is not limited.

Figure 11:
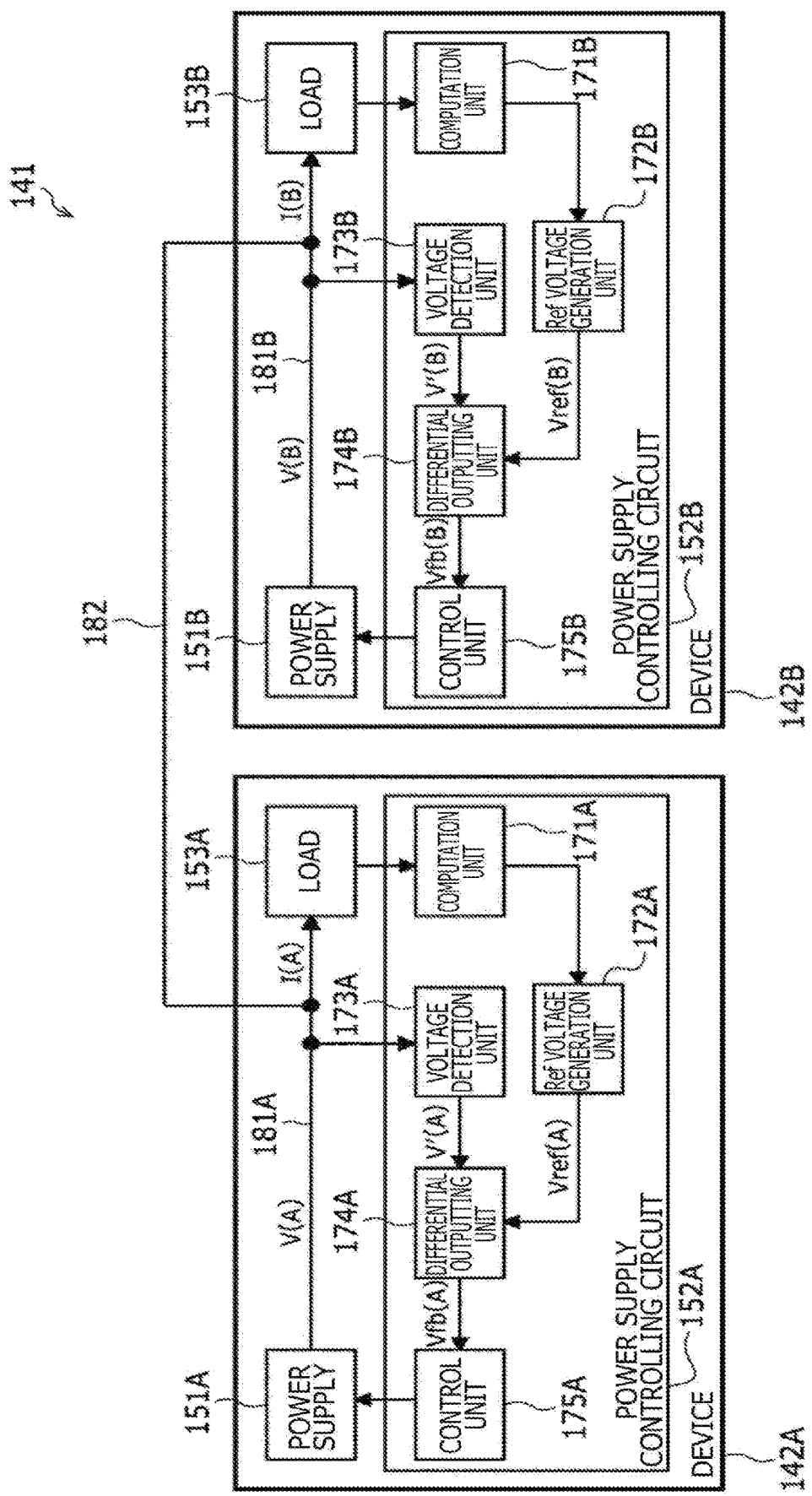
FIG. 11 is a block diagram depicting an example of a configuration of a composite apparatus including two devices.

A composite apparatus 141 of FIG. 11 includes two devices 142A and 142B.

The device 142A and the device 142B have the same configuration, and therefore, description is given of the device 142A while description of the device 142B is omitted.

The device 142A includes a power supply 151A, a power supply controlling circuit 152A, and a load 153A. The power supply 151A supplies electric power $V(A) \times I(A)$ required for operation of the load 153A to the load 153A. The power supply controlling circuit 152A controls supply of electric power from the power supply 151A. More specifically, the power supply controlling circuit 152A performs control in such a manner that electric power to be supplied from the power supply 151A to the load 153A becomes equal to a target value. The load 153A receives supply of electric power (consumes electric power) from the power supply 151A and performs predetermined operation.

The power supply controlling circuit 152A includes a computation unit 171A, a Ref voltage generation unit 172A, a voltage detection unit 173A, a differential outputting unit 174A, and a control unit 175A.

The computation unit 171A calculates a current value required for the load 153A and supplies the calculated current value to the Ref voltage generation unit 172A. The Ref voltage generation unit 172A calculates a target voltage Vref(A) on the basis of the current value supplied from the computation unit 171A and supplies the calculated target voltage Vref(A) to the differential outputting unit 174A. The target voltage Vref(A) is a value obtained from a voltage value corresponding to the required current value supplied from the computation unit 171A while taking a proportional coefficient M similar to that in the voltage detection unit 173 into consideration.

In the example of the multi-display apparatus 41 described hereinabove, the load 153A corresponds to the display unit 53, and the computation unit 171A calculates a current value required for a video to be displayed on the display unit 53.

The voltage detection unit 173A detects an actual output voltage V(A) from the power supply 151A to the load 153A and supplies a conversion voltage V'(A) converted in proportion to the output voltage V(A) to the differential outputting unit 174A. For example, the conversion voltage V'(A) is a voltage that satisfies $V'(A)=V(A)/M$ (M>0).

The differential outputting unit 174A compares the target voltage Vref(A) supplied from the Ref voltage generation unit 172A and the conversion voltage V'(A) supplied from the voltage detection unit 173A with each other, generates a differential voltage Vfb(A) for feedback on the basis of a result of the comparison, and supplies the generated differential voltage Vfb(A) to the control unit 175A.

The control unit 175A controls supply of electric power of the power supply 151A on the basis of the differential voltage Vfb(A) from the differential outputting unit 174A. More specifically, the control unit 175A performs, in a case where the conversion voltage V'(A) is lower than the target voltage Vref(A), control to raise the voltage V(A) of the power supply 151A, but performs, in a case where the conversion voltage V'(A) is higher than the target voltage Vref(A), control to lower the voltage V(A) of the power supply 151A.

Also the device 142B has a configuration similar to that of the device 142A and performs similar operation.

A voltage supply line 181A of the power supply 151A of the device 142A and a voltage supply line 181B of the power supply 151B of the device 142B are shared through a connection line 182. Consequently, the voltage V(A) of the power supply 151A and the voltage V(B) of the power supply 151B become equal to each other ($V(A)=V(B)$), and to the load 153A and the load 153B, electric power is supplied from the two power supplies 151A and 151B.

For example, in a case where the maximum power consumption of the load 153A of the single device 142A is 100 W (load 153A≤100 W), the maximum power consumption of the load 153B of the single device 142B is 100 W (load 153B≤100 W), and the maximum power consumption of the overall composite apparatus 141 is 150 W ({(load 153A)+(load 153B)}≤150 W), it is sufficient if each of the power supplies 151 of the devices 142A and 142B has the supply capability of 75 W. Since, in the power supply control of the conventional method, it is necessary for each of the devices 142A and 142B to include the power supply 151 having the supply capability of 100 W, the power supply control of the present technology can implement reduction in size and reduction in cost of the power supply 151.

Further, in a case where the power supplies 151 of the devices 142A and 142B have the supply capability of 100 W as in the conventional method, the overall composite apparatus 141 has the supply capability of 200 W ({(load 153A)+(load 153B)}≤200 W), and it is also possible, for example, to supply 200 W to the load 153A and supply 0 W to the load 153B.

Figure 12:
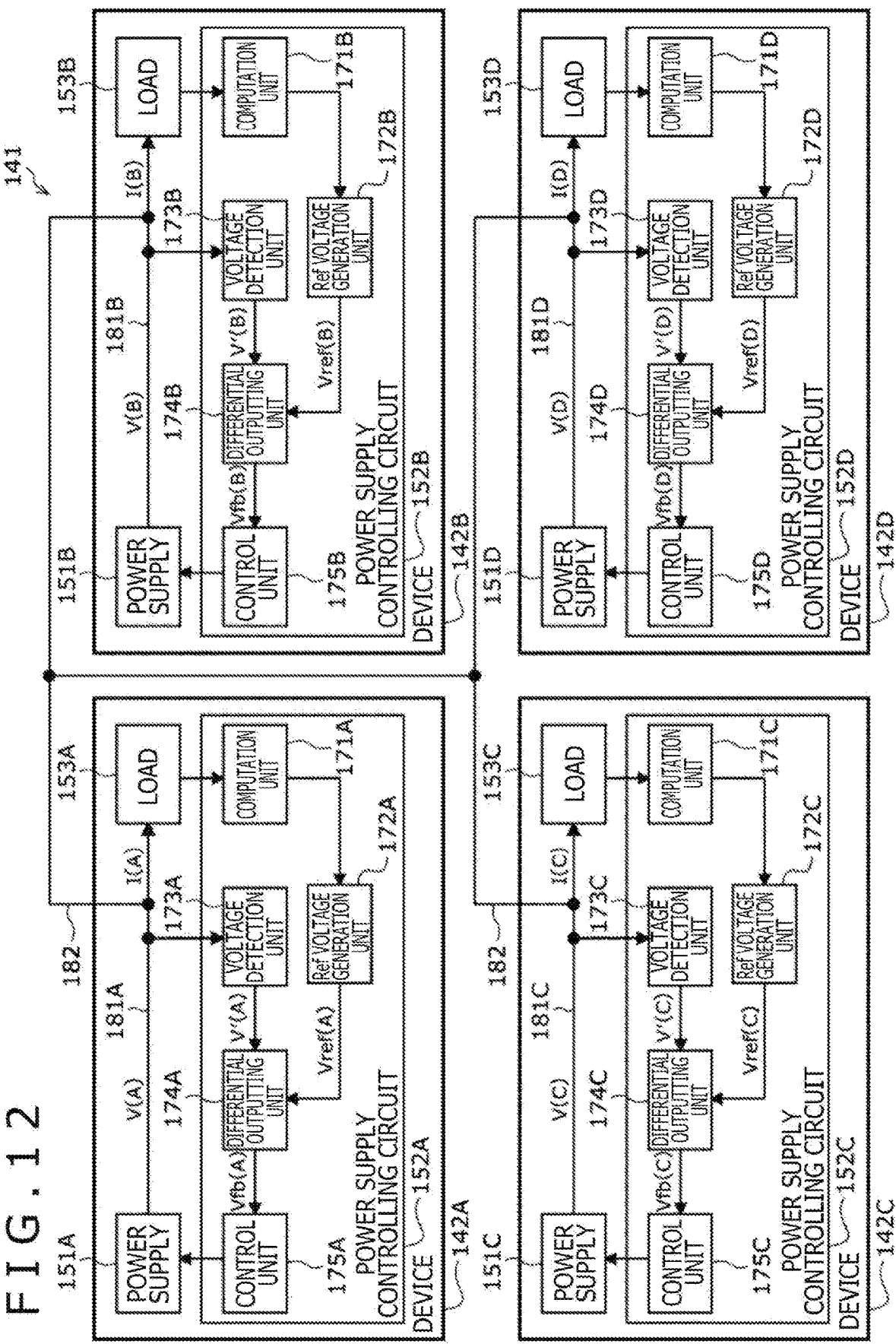
FIG. 12 is a block diagram depicting an example of a configuration of a composite apparatus including four devices.

FIG. 12 is a block diagram depicting an example of a configuration of the composite apparatus 141 in a case where the composite apparatus 141 includes four devices 142A to 142D.

Although detailed description of each of the four devices 142A to 142D is omitted because it is similar to that in FIG. 11, a voltage supply line 181A of the power supply 151A of the device 142A, a voltage supply line 181B of the power supply 151B of the device 142B, a voltage supply line 181C of the power supply 151C of the device 142C, and a power supply line 181D of the power supply 151D of the device 142D are shared through the connection line 182. Consequently, the loads 153A to 153D become equal in magnitude and the voltages of them satisfy V(A)=V(B)=V(C)=V(D), and therefore, the values of electric power to be supplied from the power supplies 151A to 151D become equal to each other.

The embodiment of the present technology is not limited to the embodiments described above and can be altered in various manners without departing from the scope of the present technology.

For example, it is possible to adopt modes in which all or part of the embodiments described above are combined.

It is to be noted that the advantages described in the present specification are exemplary to the last and are not restrictive, and advantages other than those described in the present specification may be obtained.

It is to be noted that the present technology can adopt the following configurations.

(1)

A composite display apparatus including:

multiple display devices each including a power supply having predetermined supply power; and a power supply connection unit that connects the power supplies of the respective display devices to each other in parallel, in which, in a case where at least one display device among the multiple display devices requires electric power exceeding the predetermined supply power of the power supply of the display device, electric power is supplied to the display device from the power supply of the other display device or devices.

(2)

The composite display apparatus according to (1) above, in which, in a case where the display device performs displaying with a luminance higher than a luminance corresponding to a maximum value of the supply power of the display device, it is determined that electric power exceeding the predetermined supply power of the power supply of the display device is required, and electric power is supplied to the display device from the power supply of the other display device or devices.

(3)

The composite display apparatus according to (1) or (2) above, in which each of the display devices includes a power supply controlling circuit that controls supply of electric power from the power supply of the own display device, and a first power supply controlling circuit that is the power supply controlling circuit in a predetermined one of the multiple display devices also controls the power supply controlling circuit of the other display device or devices in such a manner that supply of electric power of the power supplies of the respective display devices is balanced.

(4)

The composite display apparatus according to (3) above, in which the power supply controlling circuit of each of the multiple display devices acquires a control signal for controlling whether or not the power supply controlling circuit is to operate as the first power supply controlling circuit that also controls the power supply controlling circuit of the other display device or devices, and a predetermined one of the power supply controlling circuits that has acquired the control signal indicating that the power supply controlling circuit is to operate as the first power supply controlling circuit operates as the first power supply controlling circuit.

(5)

The composite display apparatus according to (3) or (4) above, in which the power supply controlling circuit controls supply of electric power of the power supply on the basis of an output from a differential outputting unit that outputs a difference between an actual output voltage from the power supply and a target voltage.

(6)

The composite display apparatus according to any one of (3) to (5) above, in which the power supply controlling circuit includes a current mode-controlled power supply circuit and controls supply of electric power from the power supply by switching-controlling a current.

(7)

The composite display apparatus according to (4) above, further including:

a signal generation unit that generates and outputs the control signal.

(8)

The composite display apparatus according to (5) above, further including:

a supply power controlling unit that sets the target voltage.

(9)

The composite display apparatus according to (1) or (2) above, in which each of the display devices includes a power supply controlling circuit that controls supply of electric power from the power supply of the own display device, and the power supply controlling circuit controls the own power supply in such a manner that supply of electric power of the power supplies of the respective display devices is balanced.

(10)

The composite display apparatus according to (9) above, in which the power supply controlling circuit includes a current detection element that detects a value of a current flowing through a load of the own display device and converts the current value into a voltage, and compares a first voltage obtained by the conversion by the current detection element and a second voltage that corresponds to an average value of values of currents flowing through loads of the respective display devices, to thereby control supply of electric power of the power supply on the basis of a result of the comparison.

(11)

A controlling method for a composite display apparatus that includes multiple display devices each including a power supply having predetermined supply power, and a power supply connection unit that connects the power supplies of the respective display devices to each other in parallel, the controlling method including:

causing, in a case where a first display device among the multiple display devices requires electric power exceeding the predetermined supply power of the power supply of the first display device, a second display device among the multiple display devices to supply electric power to the first display device.

REFERENCE SIGNS LIST

41: Multi-display apparatus
42A, 42B: Display device
51A, 51B: Power supply
52A, 52B: Power supply controlling circuit
53A, 53B: Display unit
54A, 54B: Power supply line
55: Power supply connection line
71A, 71B: Voltage error amplifier
72A, 72B: Bidirectional switch
73A, 73B: Current mode PWM controller
74A, 74B: Converter
75A, 75B, 76A, 76B: Resistor
77A, 77B: Target voltage generation unit
81A, 81B: Inductor
82A, 82B: MOS-FET
83A, 83B: Resistor
84A, 84B: Diode
85A, 85B: Capacitor
91: Master/slave signal generation unit
92: Supply power controlling unit
93: Connection line
101A, 101B: Converter
102A, 102B: Resistor
103A, 103B: Amplifier
104A, 104B: Comparator
105A, 105B: Resistor
141: Composite apparatus
142A to 142D: Device
151A to 151D: Power supply
152A to 152D: Power supply controlling circuit
153A to 153D: Load
171A to 171D: Computation unit
172A to 172D: Ref voltage generation unit
173A to 173D: Voltage detection unit
174A to 174D: Differential outputting unit
175A to 175D: Control unit
181A to 181D: Voltage supply line

The invention claimed is:

1. A composite display apparatus comprising:
multiple display devices each including a power supply having predetermined supply power; and
a power supply connection unit that connects the power supplies of the respective display devices to each other in parallel, wherein,
in a case where at least one display device among the multiple display devices requires electric power exceeding the predetermined supply power of the power supply of the display device, electric power is supplied to the display device from the power supply of the other display device or devices,
wherein
each of the display devices includes a power supply controlling circuit that controls supply of electric power from the power supply of the own display device, and
a first power supply controlling circuit that is the power supply controlling circuit in a predetermined one of the multiple display devices also controls the power supply controlling circuit of the other display device or devices in such a manner that supply of electric power of the power supplies of the respective display devices is balanced,
wherein
the power supply controlling circuit of each of the multiple display devices acquires a control signal for controlling whether or not the power supply controlling circuit is to operate as the first power supply controlling circuit that also controls the power supply controlling circuit of the other display device or devices, and
a predetermined one of the power supply controlling circuits that has acquired the control signal indicating that the power supply controlling circuit is to operate as the first power supply controlling circuit operates as the first power supply controlling circuit.

2. The composite display apparatus according to claim 1, wherein
the power supply controlling circuit controls supply of electric power of the power supply on a basis of an output from a differential outputting unit that outputs a difference between an actual output voltage from the power supply and a target voltage.

3. The composite display apparatus according to claim 1, wherein
the power supply controlling circuit includes a current mode-controlled power supply circuit and controls supply of electric power from the power supply by switching-controlling a current.

4. The composite display apparatus according to claim 1, further comprising:
a signal generation unit that generates and outputs the control signal.

5. The composite display apparatus according to claim 2, further comprising:
a supply power controlling unit that sets the target voltage.

6. The composite display apparatus according to claim 1, wherein
each of the display devices includes a power supply controlling circuit that controls supply of electric power from the power supply of the own display device, and
the power supply controlling circuit controls the own power supply in such a manner that supply of electric power of the power supplies of the respective display devices is balanced.

7. The composite display apparatus according to claim 1, wherein,
in a case where the display device performs displaying with a luminance higher than a luminance corresponding to a maximum value of the supply power of the display device, it is determined that electric power exceeding the predetermined supply power of the power supply of the display device is required, and electric power is supplied to the display device from the power supply of the other display device or devices.

8. A composite display apparatus comprising:
multiple display devices each including a power supply having predetermined supply power; and
a power supply connection unit that connects the power supplies of the respective display devices to each other in parallel, wherein,
in a case where at least one display device among the multiple display devices requires electric power exceeding the predetermined supply power of the power supply of the display device, electric power is supplied to the display device from the power supply of the other display device or devices, wherein
each of the display devices includes a power supply controlling circuit that controls supply of electric power from the power supply of the own display device, and
a first power supply controlling circuit that is the power supply controlling circuit in a predetermined one of the multiple display devices also controls the power supply controlling circuit of the other display device or devices in such a manner that supply of electric power of the power supplies of the respective display devices is balanced,
wherein
the power supply controlling circuit includes a current detection element that detects a value of a current flowing through a load of the own display device and converts the current value into a voltage, and compares a first voltage obtained by the conversion by the current detection element and a second voltage that corresponds to an average value of values of currents flowing through loads of the respective display devices, to thereby control supply of electric power of the power supply on a basis of a result of the comparison.

* * * * *